United States Patent [19]

Horve

[11] Patent Number: 5,350,181
[45] Date of Patent: Sep. 27, 1994

[54] PUMPING FEATURE ON WEAR SLEEVE FOR UNITIZED SEAL

[75] Inventor: Leslie A. Horve, Deer Park, Ill.

[73] Assignee: SKF USA Inc., Elgin, Ill.

[21] Appl. No.: 64,742

[22] Filed: May 19, 1993

Related U.S. Application Data

[63] Continuation of Ser. No. 769,082, Sep. 30, 1991, abandoned.

[51] Int. Cl.$^5$ .............................. F16J 15/32
[52] U.S. Cl. ........................ 277/35; 277/134; 277/152
[58] Field of Search .............. 277/35, 134, 133, 152, 277/153

[56] References Cited

U.S. PATENT DOCUMENTS

| | | | |
|---|---|---|---|
| 2,860,896 | 11/1958 | Naumann | 277/134 |
| 3,347,554 | 10/1967 | Jagger et al. | 277/134 |
| 3,554,561 | 1/1971 | Weinand | 277/134 |
| 3,633,927 | 1/1972 | VanDeven | 277/134 |
| 3,913,925 | 10/1975 | Gyory | 277/134 X |
| 4,239,243 | 12/1980 | Bainard et al. | 277/153 |
| 4,252,329 | 2/1981 | Messenger | 277/153 X |
| 4,448,426 | 5/1984 | Jackowski et al. | 277/153 X |
| 4,501,431 | 2/1985 | Peisker et al. | 277/134 |
| 4,573,690 | 3/1986 | DeHart et al. | 277/134 X |
| 4,596,394 | 6/1986 | Schmitt | 277/152 X |
| 4,709,930 | 12/1987 | Forch | 277/134 X |
| 4,723,350 | 2/1988 | Kobayashi et al. | 277/134 X |
| 4,746,128 | 5/1988 | Freiwald | 277/152 X |
| 4,822,055 | 4/1989 | Hogan | 277/152 X |
| 4,971,306 | 11/1990 | Jinnouchi et al. | 277/134 X |
| 5,013,052 | 5/1991 | Butler et al. | 277/153 |
| 5,201,529 | 4/1993 | Heinzen | 277/153 X |

FOREIGN PATENT DOCUMENTS

| | | | |
|---|---|---|---|
| 0190576 | 10/1984 | Japan | 277/153 |
| 1239873 | 7/1971 | United Kingdom | 277/134 |

*Primary Examiner*—William A. Cuchlinski, Jr.
*Assistant Examiner*—John L. Beres
*Attorney, Agent, or Firm*—James T. FitzGibbon

[57] ABSTRACT

A fluid seal assembly with a primary seal element and a wear sleeve element. The primary seal includes a casing and a seal element that contacts a sealing surface on the wear sleeve. The wear sleeve has a cylindrical portion that overlies a portion of the sealed mechanism, and the cylindrical portion has a surface pattern thereon formed by metal cold flow, preferably by drawing and ironing. The surface pattern includes at least one hydrodynamic pumping element having a contoured portion that is radially offset from the remainder of the cylindrical portion of the sleeve.

9 Claims, 3 Drawing Sheets

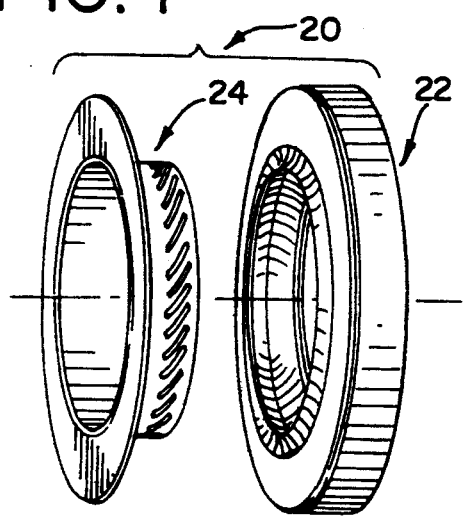
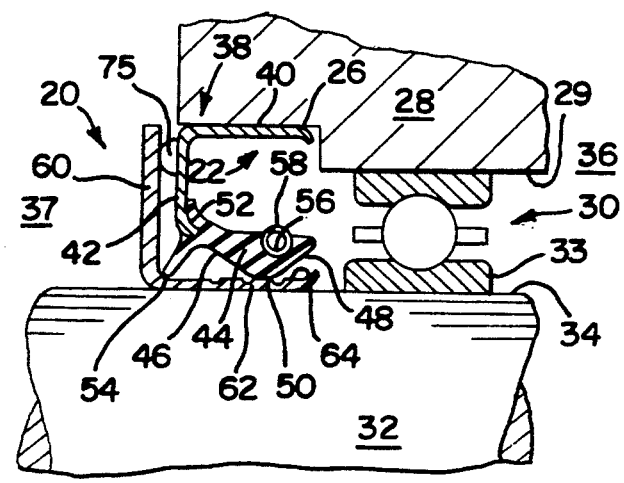
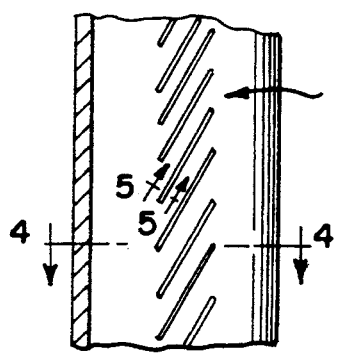
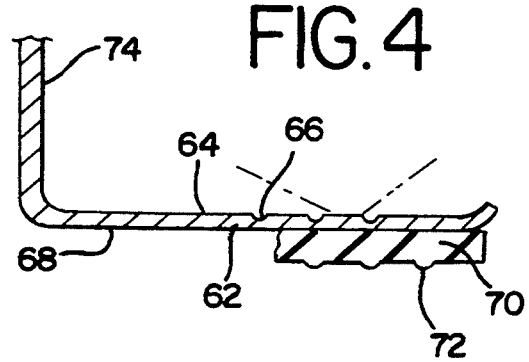
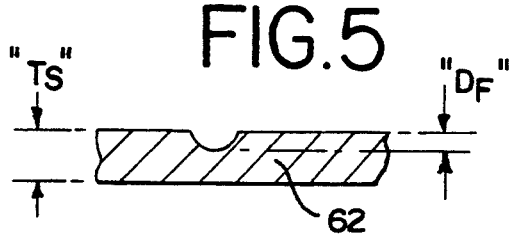
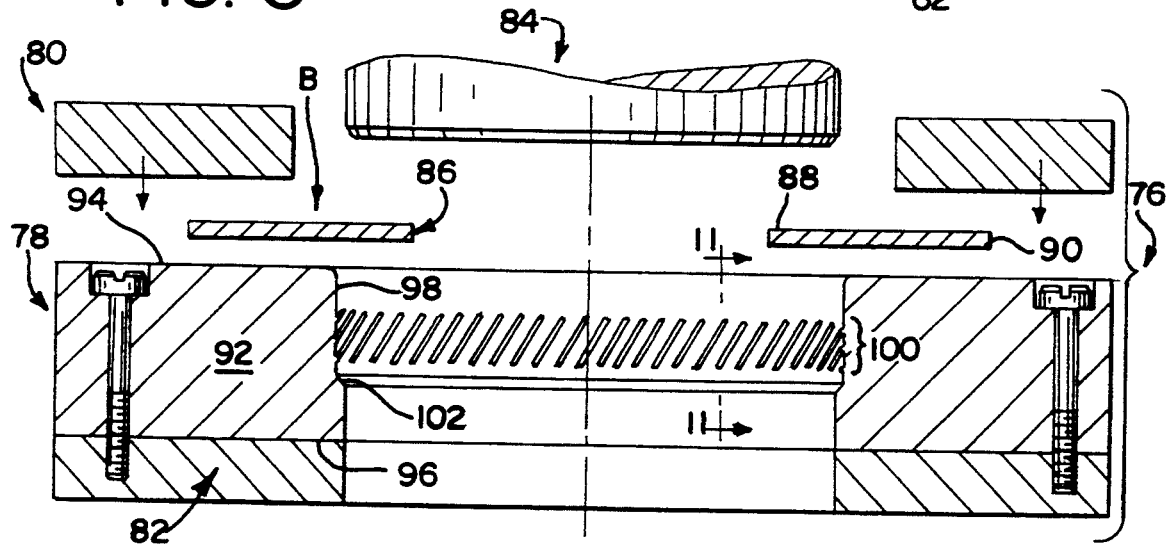

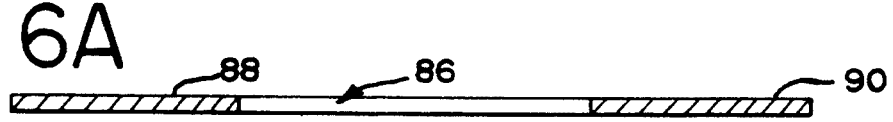
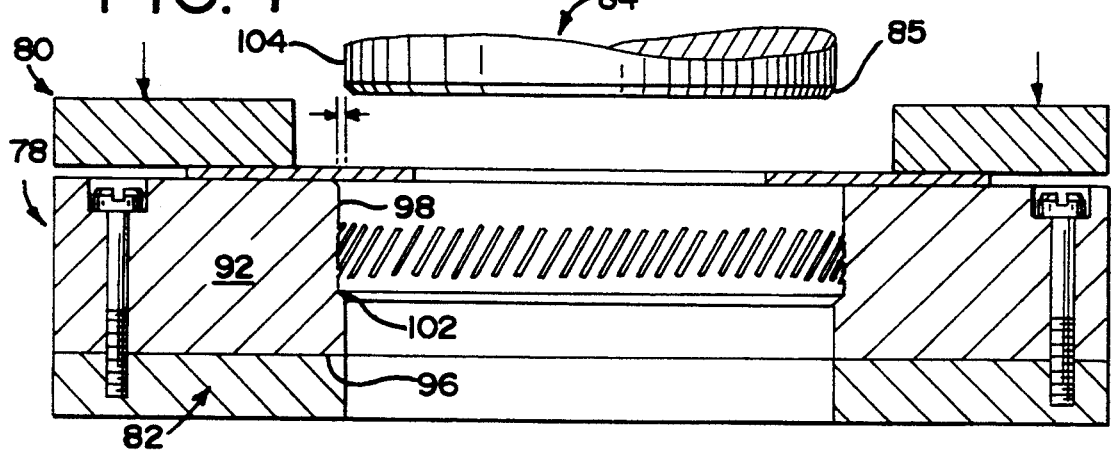
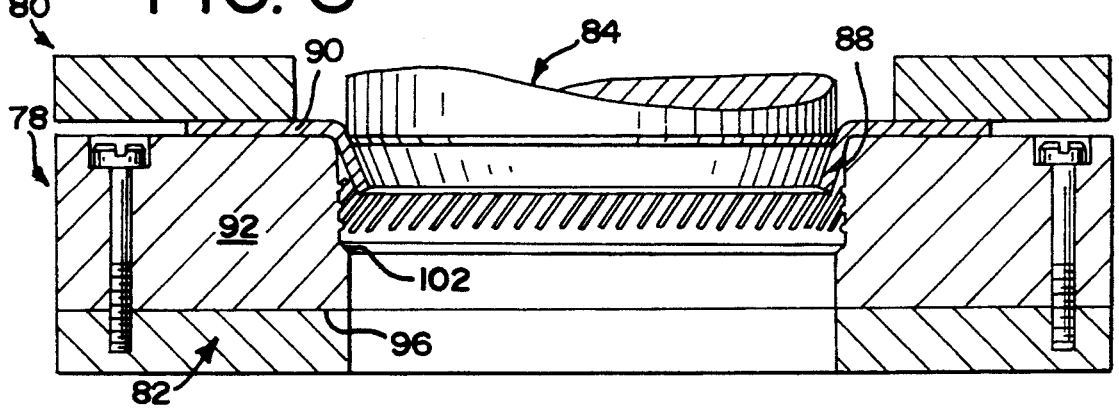
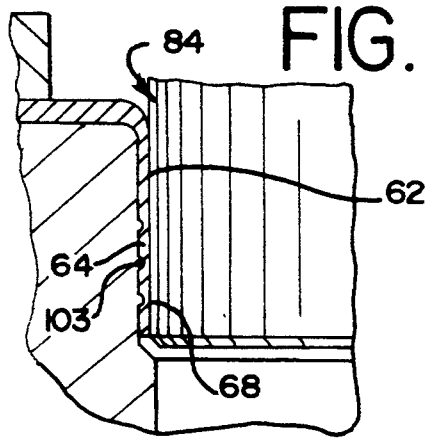
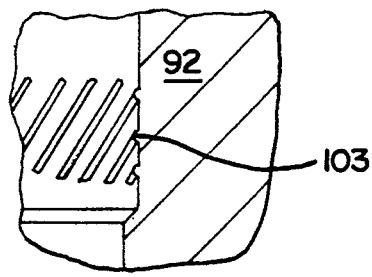
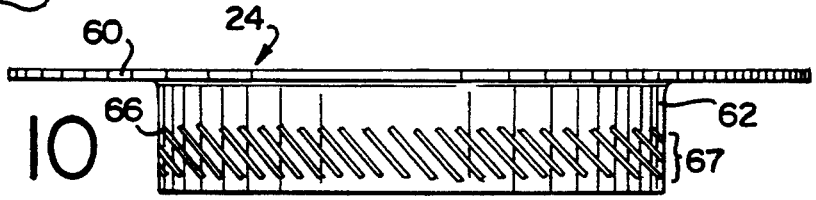

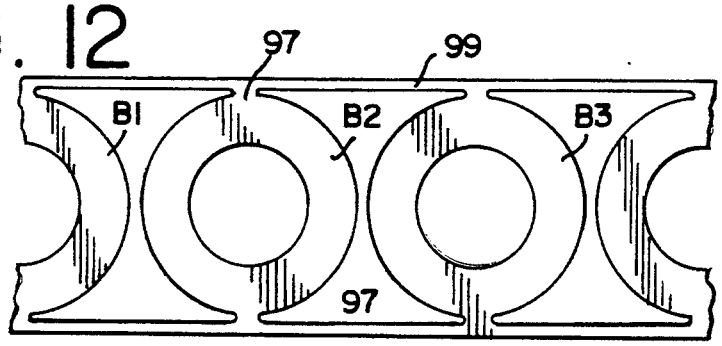
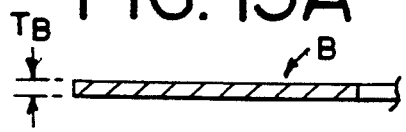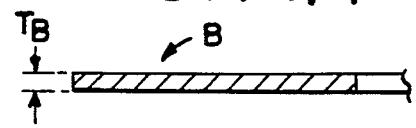
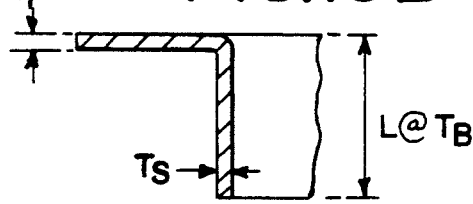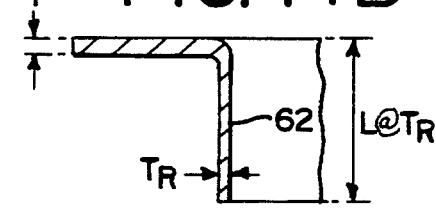
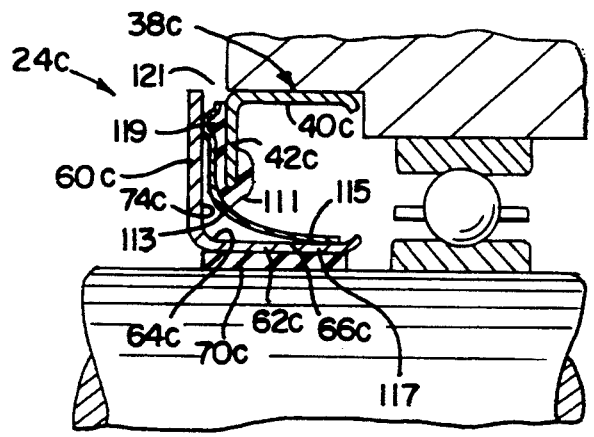
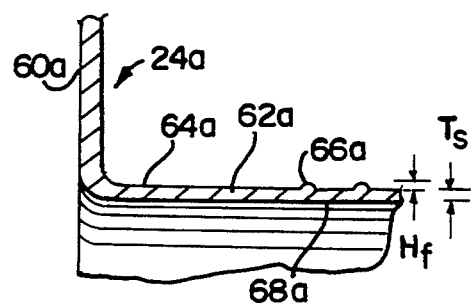
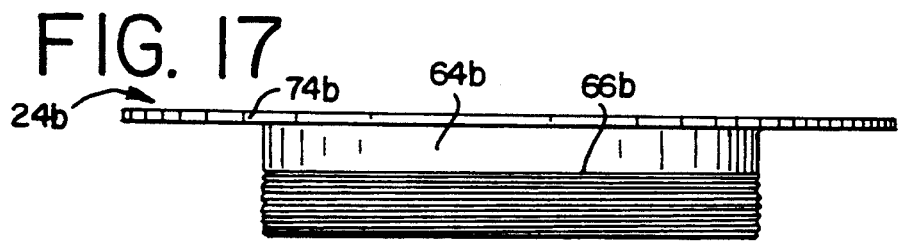

PUMPING FEATURE ON WEAR SLEEVE FOR UNITIZED SEAL

This application is a continuation of U.S. patent application Ser. No. 07/769,082, filed Sept. 30, 1991, now abandoned.

The present invention relates generally to fluid seals, usually oil seals, and more particularly, to novel hydrodynamic oil seals and methods for producing them.

By "hydrodynamic" is meant an oil seal which, when one of the sealed parts is rotated to the other, develops a positive pumping pressure serving to return liquid phase oil accumulating on a surface wetted by the oil back into the sealed cavity. This phenomenon of oil being "pumped" or forced between the seal band formed by contact between a portion of the elastomeric seal body and the surface against which it is working is referred to as "hydrodynamic" because the pumping action occurs only upon relative movement of the parts. This is distinguished from a static seal which depends in part on interference or a snug fit between associated parts. In the seal industry, a seal between parts which are never intended to move relative to each other is usually referred to as a static or secondary seal, while a seal between parts which move relative to each other is referred to as a dynamic or primary seal.

By way of background, hydrodynamic seals have been known for many years. Most hydrodynamic seals operate by the type of pumping action referred to above, wherein vanes, ribs or the like are formed on a part of the elastomeric seal lip body on or near the primary seal band area. While some seals have been proposed wherein auxiliary formations of one sort or another, including the ribs or vanes just referred to, are formed literally along the primary seal area, this type of seal does not usually deliver good static or "at-rest" performance. Therefore, the most common hydrodynamic seals are those wherein the primary seal band, formed by the convergence of frustoconical surfaces, lies snugly along the surface of a shaft or other part to be sealed, and the ribs or vanes are formed on one (or conceivably both) of the frustoconical surfaces- Seals of this type include those shown in U.S. Pat. Nos. 3,640,542, 3,790,180 and 3,807,743, for example.

Other forms of hydrodynamic seals include those wherein the frustoconical air or exterior side of the seal includes other formations such as pads or sinuous ribs approaching and departing periodically from the seal band or a point of contact between the seal lip and its companion sealed surface.

Still other forms of hydrodynamic seal include those wherein sinuosity in the lip itself is effective to create a pumping action which arises by reason of the difference in angular inclinations between the air and oil sides of the seal. These seals include those disclosed in U.S. Pat. No. 3,927,600, for example, which patent is owned by the assignee hereof.

Those seals referred to above and shown in the various patents enumerated operate on the principle of a pumping action created by the relative motion between the pumping formation and the oil lying on a smooth surface. In these kinds of seals, where there is little, if any, oil over and above that creating a thin film of lubricant between the two sealed parts, there is not sufficient additional oil for pumping to occur. A thin, strongly adherent lubricating film then usually remains in place which is effective to lubricate the parts. When there is excess oil, it is pumped back into the cavity from which it leaked.

While the rib, vane or like kinds of seals just described are by far the most common kinds of hydrodynamic seals, proposals have also been made regarding a reversal of parts, i.e., forming grooves or the like in the shaft itself and leaving the seal lip free from pumping ribs, vanes or other formations. Such proposals are not believed to have achieved measurable success, whether the pumping formations are formed as depressions or grooves within the shaft or as projections extending outwardly from the shaft surface. Most of such proposed constructions are not generally thought to be practical, for various reasons.

For example, forming grooves in an expensive, precisely machined shaft surface, particularly one that has been finished ground and/or hardened, is very expensive and time consuming relative to forming the pumping elements on the other mating part, that is, the elastomeric seal body, a part which is made by molding.

In addition, imparting radially extending formations into a shaft would call for multi-piece molds or mold with movable parts, or for post-manufacturing operations of various kinds.

However, certain advantages can be gained with the use of the contoured shaft concept, assuming that the difficulties therewith can be overcome. In this connection, the present invention provides a seal assembly with the pumping elements advantageously located on a part fixed to the shaft surface rather than on the elastomeric seal body itself. These advantages include the potential for better performance during the initial or "bedding in" phase of operation, reduced variation of pumping effectiveness during seal life, and the ability to control rib or vane formation and surface finish in the same operation.

In this respect, any hydrodynamic seal works best when the surface finish of the shaft with which it is associated can be carefully controlled. It is now known in the seal industry that whereas a sealed metal surface having excessive roughness in its finish will cause rapid seal wear and thus be the subject of questionable performance in use, a surface finish which is too smooth may surprisingly not possess the ability to seal well, either. Some surface finishes are so smooth that the number of aspirates or surface projections is insufficient to engage and retain a film of oil. Thus, the thin film of oil necessary to lubrication cannot be retained on the surface. Such excessively smooth surface finishes may also create an adverse static leakage or capillary action situation which results from a combination of cohesive forces in the oil film and the wetting action on the shaft or seal.

Because of the foregoing difficulties, successful seals have not been proposed or able to be produced on a large scale which were able to incorporate pumping grooves, slots or like formations on the metal part of the shaft seal unit.

However, according to the present invention, it has now been made possible to produce such a seal by forming grooves, slots, or other desirable formations on the skirt portion of an oil seal wear sleeve. According to the invention, therefore, a two-element seal is preferably provided. One element includes a casing and an elastomeric seal body and the other element includes a wear sleeve with one surface of its skirt portion adapted to be received in snug, liquid-tight static seal relation to an associated shaft. According to the invention, "drawing and ironing" metal-forming techniques are used to provide slots, grooves, vanes or other hydrodynamic formations in the exposed surface of the wear sleeve skirt, usually its outside diameter or ("o.d.") without compromising the surface finish necessary to a good secondary seal between the other skirt surface, usually its inside diameter ("i.d.") and the outside diameter of the shaft. In other words, one surface of the wear sleeve skirt has hydrodynamic formations, while the other surface does not.

If the seal lip acts inwardly, the seal element is pressed in the counterbore and the wear sleeve fits over the shaft OD. If the seal is an outwardly acting seal, however, for example, the sleeve is pressed into the counterbore and its primary sealing surface will face in; the seal element having the lip is pressed over the shaft OD and the seal lips acts outwardly against the sleeve. Seals of the present invention are effective in both applications.

In view of the failure of the prior art to provide a successful seal assembly having an oil seal element and a wear sleeve element which includes a wear sleeve skirt incorporating hydrodynamic pumping elements formed by a drawing and ironing process, it is an object of the present invention to provide such a novel seal assembly and one or more methods of making it.

Another object is to provide an improved oil seal assembly which includes a wear sleeve component having pumping formations such as slots or vanes extending inwardly or ribs extending outwardly from the seal-facing surface of the sleeve skirt for cooperative action with a portion of the elastomeric seal lip forming the other portion of the seal assembly, with the sleeve also having an opposite skirt surface free of slots, ribs or raised formations to insure a good static seal.

Yet another object of the invention is to provide a wear sleeve which is readily receivable over a portion of an existing shaft and which will create a hydrodynamic effect when the wear sleeve skirt is mated with a conventional oil seal having an elastomeric lip portion, and the parts are rotated relative to each other.

A still further object of the invention is to provide a method of forming a wear sleeve so as to incorporate a pattern of plural hydrodynamic elements on at least one of its skirt or axial flange surfaces.

A further object of the invention is to provide a method of providing a pumping action in a conventional fluid seal by associating such a seal with a wear sleeve having hydrodynamic elements formed in the skirt or axial flange of the wear sleeve.

Another object of the invention is to provide the capability of achieving varying degrees of hydrodynamic pumping action or performance using the same elastomeric seal, such capability being provided by associating the seal with a sleeve having different hydrodynamic patterns on its active surface.

Yet another object of the invention is to provide an apparatus and method for creating hydrodynamic formations in the skirt portions of wear sleeve elements.

A still further object of the invention is to provide a method of forming hydrodynamic formations in wear sleeves which includes disposing a wear sleeve forming blank in a drawing and forming die, and securing said blank against axial movement while passing a drawing punch through the die opening so as to iron the skirt thus formed and impress a hydrodynamic surface pattern on the wear sleeve skirt, the reverse image of such pattern having been imparted to a facing surface of the forming die.

Yet another object is to provide a drawing and forming punch and die arrangement for producing patterned wear sleeves, with the die set including forming die with a generally cylindrical, patterned inside surface, and a drawing punch with its outer or working surface spaced apart from the patterned surface by a distance less than the thickness of the blank of material from which wear sleeve is to be formed, and whereby upon relative movement of punch and the die, the skirt will be drawn to an extended length and a reduced thickness, while hydrodynamic formations will be formed by cold metal flow in the portion of the wear sleeve skirt facing the patterned surface of the forming die.

An additional object of the invention is to provide a hydrodynamic seal incorporating a wear sleeve with hydrodynamic formations therein, with the wear sleeve being effective to provide hydrodynamic performance in seals using materials which previously rendered achieving a hydrodynamic capability difficult or impossible.

A still further object of the invention is to provide a wear sleeve unit having extremely small but effective grooves, slots, or ribs capable of imparting a hydrodynamic action to a seal wherein the seal lip is made from a relatively non-elastomeric material such as a sheet of a TFE material.

A still further object of the invention is to provide a seal unit wherein the hydrodynamic formations are formed by cold flow in a material which is more wear-resistant than is the associated material used to form the seal lip.

The foregoing and other objects and advantages of the invention are achieved in practice by providing a wear sleeve having hydrodynamic pumping elements formed therein by a drawing and ironing method and apparatus. The invention also achieves its objects by providing an oil seal assembly including a seal unit comprising a casing and a sealing element that includes a seal band portion, with the seal band thus formed acting to contact the skirt portion of a shaft-covering wear sleeve element, with the skirt including at least one pumping formation ironed into its surface, whereby relative rotation of the parts creates a pumping action within the film of oil separating the wear sleeve skirt and seal band surfaces, respectively.

The manner in which the foregoing and other objects and advantages of the invention are achieved in practice will become more clearly apparent when reference is made to the following detailed description of the preferred embodiments of the invention set forth by way of example, and shown in the accompanying drawings, wherein like reference numbers indicate corresponding parts throughout.

BRIEF DESCRIPTION OF THE DRAWINGS

FIG. 1 is an exploded perspective view of one form of oil seal assembly made according to the present invention;

FIG. 2 is an enlarged vertical sectional view of a portion of the seal of the invention, shown in a typical installation;

FIG. 3 is an enlarged fragmentary plan view of the outer diameter surface of the wear sleeve skirt, showing one form of hydrodynamic formations formed therein by the method of the present invention;

FIG. 4 is a further enlarged sectional view, taken along lines 4—4 of FIG. 3 and showing additional details of one form of the pumping elements incorporating the features of the invention;

FIG. 5 is still further enlarged sectional view, taken along lines 5—5 of FIG. 3 and showing certain relative dimensions and other aspects of the pumping formations;

FIG. 6 is an exploded vertical sectional view of a die set adapted for practicing the present invention and showing the same in a fully opened position and further showing the positioning of a blank for forming a wear sleeve with a hydrodynamic pattern on one surface of its skirt;

FIG. 6A is a sectional view of the sleeve-forming blank only;

FIG. 7 is a view similar to that of FIG. 6, showing the drawing punch and showing the wear sleeve-forming blank in a clamped position between the drawing and forming die and the holddown ring, and also showing certain reference dimensions of the die set and the forming blank;

FIG. 8 is a view similar to that of FIG. 7, showing the drawing punch just after initial engagement with the skirt-forming portion of the blank;

FIG. 9 is a fragmentary sectional view on a further enlarged scale, showing the drawing punch at the bottom of the stroke and with the wear sleeve skirt being fully formed and patterned;

FIG. 10 is an elevational view of a wear sleeve made in the apparatus of FIG. 6–9, and showing the same with one form of hydrodynamic pattern impressed on the skirt outer diameter;

FIG. 11 is a fragmentary view, partly in elevation and partly in section, and taken along lines 11—11 of FIG. 6, showing more detail of the hydrodynamic pattern formed on the inside wall of the drawing and forming die;

FIG. 12 is a top plan view of a continuous length of sheet metal from which a group of individual blanks is in the process of being formed, showing the blanks with their centers pierced and with marginal tabs holding the blanks to the sheet margins prior to separation of individual blanks on the forming press;

FIGS. 13A and 13B are schematic sectional views illustrating portions of a wear sleeve forming blank and a wear sleeve made therefrom according to prior art practices;

FIGS. 14A and 14B are sectional views respectively of a skirt-forming blank and an inventive sleeve made therefrom and incorporating the novel patterned skirt of the invention;

FIG. 15 is a fragmentary vertical sectional view similar to that of FIG. 2, but showing another form of seal embodying the invention;

FIG. 16 is an enlarged fragmentary view of a portion of a wear sleeve incorporating a different form of the invention; and FIG. 17 is an elevational view showing a wear sleeve having a presently preferred form of groove or slot formed in its outer diameter surface.

DESCRIPTION OF THE PREFERRED EMBODIMENTS OF THE INVENTION

While the present invention may be embodied in different forms and types of seal assemblies, a description of certain presently preferred forms of seal will be given. In these units, the seal assembly is a two-element unit, including a primary seal element and a wear sleeve element, and the hydrodynamic elements are formed in a portion of the outer diameter of the wear sleeve skirt. In some examples, the primary seal unit is of a conventional elastomeric construction, and in others, the primary seal is made from a resinous film. The hydrodynamic or pumping element or other elements may be of any suitable form, and may be "male" or "female", i.e., embossed or debossed.

It is within the scope of the invention to have certain of the parts reversed in orientation, that is, to have the seal rotate and the wear sleeve remain fixed. The patterns may consist of sunken or debossed grooves, slots or the like, or may comprise raised formations such as ribs, for example. The patterns of individual elements, may vary widely according to the choice of the user. Likewise, the preferred materials from which the wear sleeve skirt is made is a drawing grade of steel; however, other ferrous and non-ferrous materials may be used in appropriate applications.

The drawings illustrate certain forms of seal that embody the present invention and show illustrative, preferred methods of making the products.

Thus, referring to FIG. 1, there is shown an oil seal assembly generally designated 20 and shown to include a primary seal unit generally designated 22 and a wear sleeve unit generally designated 24. In use, as shown in FIG. 2, the seal unit 22 is intended to be inserted within a counterbore 26 in a machine member 28. The machine member may include a principal bore 29 serving to locate a bearing assembly generally designated 30 which journals a rotary shaft 32 by engagement between a bearing race 33 and the outside diameter surface 34 of the shaft 32.

The above-described parts define at least in part a sealed region 36 lying to the right of the seal assembly 20 as shown in FIG. 2, and it is this area 36 wherein the oil or other fluid sought to be retained is confined. To the left as shown in FIG. 2 is an exterior region 37; dirt, grit and the like from this area is not intended to enter the sealed region and the oil from the sealed region 36 is not intended to leak into the outside area or atmosphere 37.

Referring again to the details of the mechanism, the primary seal unit 22 includes a suitably formed rigid casing generally designated 38 and usually made from metal. The primary seal casing 38 includes an axially extending mounting flange 40 and a radially extending, lip body bonding flange 42, an inner margin of which has bonded thereto an elastomeric seal body 44. A pair of frustoconical surfaces, namely, an "air" side surface 46 and an "oil" side surface 48 meet along a generally circular locus to form a seal band 50. As is conventional in current seal products, a bonding tab 52 lies at one end of the seal body 44 for attachment to the inner margin of the radial casing flange 42.

An excluder lip 54 is shown to be formed as a part of the body 44; such a lip 54 is preferred in many instances, but is not strictly necessary to the practice of the invention. The elastomeric seal body 44 also includes a spring groove 56 for confining a garter spring 58 adapted to provide or enhance a radial compressive load to be applied by the seal band 50 to the outer diameter shaft surface 34 to provide the "primary" seal, i.e., the seal between parts that move relative to each other.

Referring now to the other component, namely, the wear sleeve unit 24, this unit 24 is shown in FIG. 2 to include a radially extending excluder flange 60 of a given thickness. According to the invention, the wear sleeve 24 also includes an axially extending, shaftengaging skirt portion 62 of reduced thickness relative to the thickness of the flange 60. The outer diameter surface 64 (FIG. 4) of the wear sleeve 24 includes, as is best shown in FIGS. 3-5, a plurality of individual hydrodynamic groove elements 66, arranged in an array or pattern such as that shown at 67 in FIG. 3.

The elements 66 of the formation are extremely small, narrow slots, grooves or the like, as will be described. The inside diameter surface 68 of the skirt portion 60 is completely cylindrical and desirably includes no discontinuities or formations of any kind, either impressed within or extending outwardly from the i.d. surface 68 of the skirt 62. As is shown in FIG. 4, the i.d. surface 68 of the skirt 62 may optimally include a rubber sleeve unit 70 bonded thereto, and the sleeve may include plural, spaced apart mounting ribs 72 for snug, liquid-tight engagement with the outer diameter surface 34 of the shaft 32. Wear sleeves including this feature are commonly referred to as "rubber i.d." sleeves (or seals). If the skirt 62 has a metal i.d. only, such surface 62 fits snugly over the surface 34 of its shaft 32.

Referring again to FIGS. 3 and 4, it will be noted that the wear sleeve unit 24 is also shown to include an inner end face surface 74 which may be engaged by or closely spaced apart from a snubber 75 (FIG. 2) on the primary seal unit 22. Such a snubber may act as an auxiliary excluder unit or may merely serve to position the parts upon initial assembly.

Referring now to FIG. 5, two arrows show a thickness designated "$T_s$" showing the thickness of the sleeve and in addition, there are spaced apart dimensional arrows schematically, and not to scale, showing the depth "$D_f$" of the hydrodynamic formations impressed thereon. In a typical application, the thickness "$T_s$" of the wear sleeve may be from about 0.020" to 0.040" or more in thickness, while the depth of the formation "D" is very small in relation to such height. In one preferred form of the invention, the depth of this formation or element is only about 0.0005", i.e., one-half of 1/1000th of an inch. Preferably, the formation for most applications is between about 0.0005" and 0,001". In other cases, this dimension may be even smaller; it may be as large as 0.003" or more, for example, depending on different aspects of the situation including the type of sealed medium, the remainder of the surface finish on the shaft, the operating temperature and the material from which the seal body is made.

Referring now to FIG. 6, there is shown a drawing and forming die assembly generally designated 76 and shown to include a forming die generally designated 78, a holddown ring generally designated 80, a forming die support ring generally designated 82, and a drawing punch generally designated 84. When it is desired to make sleeves embodying the invention, a blank generally designated "B" for forming a wear sleeve 24, is disposed within the assembly 76. The wear sleeve forming blank "B" is shown as in FIGS. 6 and 6A to include a center opening generally designated 86, defined by an inner, skirt-forming margin 88. The outer diameter of the blank is defined by a flange-forming margin 90.

Referring again to FIG. 6, it is shown that the forming die 78 of the die and punch assembly includes a die body 92, with an upper, work support surface 94 and a lower mounting surface 96 as well as an inwardly directed surface 98 for forming the outside diameter of the wear sleeve skirt 62. The surface 98 includes a patterned area 100 lying generally centrally of the inside cylindrical surface 98 as a whole. The patterned area is shown and described in detail elsewhere herein. A tapered shoulder 102 is shown to define the lower edge of the surface 98.

Referring now to FIGS. 7-9, construction and operation of the drawing punch 84 are shown. This part is essentially a cylindrical rod with an outer diameter surface 104 that is preferably very smooth; the punch 84 also includes a lower bevel or taper 85 for initial engagement of the edge of the inner blank margin 88.

Referring now to the drawing and forming operation of the invention, as shown in FIGS. 6-9, the operation is relatively straightforward and analogous to the so-called "drawing and ironing" type of metal forming possible with suitable tooling.

In particular, and referring to FIG. 6, assuming it is desired to create a patterned wear sleeve having plural hydrodynamic elements thereon according to the invention, a blank "B" such as that shown in FIG. 6A is positioned intermediate the holddown ring 80 and the upper surface 94 of the drawing and forming die body 92. With the ring precisely centered by means (not shown) known to those skilled in the art, a forming press is actuated so as to move the die set just described in the desired sequence.

First, the holddown ring 80 is advanced under high force until it "bottoms out", firmly clamping the outside margin 90 of the blank "B" between itself and the forming die upper surface 94. Thereupon, the drawing and forming punch 84 is advanced downwardly as shown in FIGS. 7 and 8. Initially, contact is made as shown in FIG. 8 where the leading or beveled edge 85 of the forming punch 84 contacts an upwardly directed surface of the skirt-forming portion 88 of the blank "B". At this point, initial deformation of the being-formed skirt takes place. As shown in FIG. 8, this initially deflects the skirt both axially downwardly and radially outwardly and into snug relation with the inside surface 98 of the drawing and forming die body 92. As the punch is advanced while precisely aligned, the skirt 62 is finally formed as shown in FIG. 9. The skirt-forming area 88 of the blank "B" is drawn into a cylindrical shape with the o.d. and i.d. wear sleeve surfaces 64, 68, being fully dimensioned and formed upon completion of the punch stroke.

Referring now to dimension changes during wear sleeve formation, FIGS. 13A and 13B, show that, in the prior art, the thickness of the skirt "$T_s$" in FIG. 13B would be substantially equal to the thickness of the flange "$T_f$", which in turn would be the same as the thickness "$T_b$" of the blank "B" from which the wear sleeve is formed. Hence, according to prior art skirt-forming techniques, when a blank of thickness "Tb" is formed into a so-called "L-cup" (referring to its shape in cross-section) a wear sleeve results which has the same or similar thickness in its radial portion as in its axial flange. The skirt length "L" in FIG. 13B is able to be calculated by known methods and, depending on the size of the center opening and the length of draw, will have a characteristic length. In FIG. 13A, this length is listed as "L@ $T_b$" meaning that the length will be a certain length, provided that the thickness of the being-formed skirt section remains substantially the same as the thickness of the material from which the blank is made.

Referring now to FIG. 14A, the drawing and forming action used to make a skirt according to the present invention is shown. Here, a thickness "$T_b$", is shown for a blank "B." Typically, this might be 0.032" for example. When a forming operation according to the present invention is completed, the thickness of the radial flange of the wear sleeve "$T_f$" as shown in 14B will be substantially equal to the initial thickness "$T_b$" of the blank itself. However, when the skirt shown in FIG. 14B is formed according to the present invention, then the skirt portion 62 will have a measurably reduced thickness "$T_r$", and an elongated length "$L@T_r$. Customarily, in a preferred form of the present invention, the flange is elongated some 15% to 18% with respect to the dimension it would have without thickness reduction. The thickness of the flange is usually reduced by about 20%, by way of example, during this operation. The finished skirt might then typically have a thickness $T_r$ of 0.025–0,028, for example.

The drawing and ironing operation thus described is achieved by providing a suitable working clearance between the drawing punch o.d. surface 104 (FIGS. 7–9) and the i.d. surface 98 of the drawing and forming die. By way of example, in a typical prior art wear sleeve forming operation, given a shaft diameter of just less than 2.00", and assuming that the i.d. of the wear sleeve were to be fit metal-to-metal on the shaft o.d., then the drawing punch might have an o.d. of 2,000 and, assuming a metal thickness of 0,032", then the i.d. of the forming die might be 2.060". This would thus create a total working clearance (on diameters) of 0.060 between the punch and the die. With such a diametral clearance, the actual clearance at any one point would be one-half that amount or 0.030". This would thus create a reduction of approximately only 0.001" to 0.002" at each point on the part surface, i.e., a thickness reduction of approximately 3% or less. The elongation of the skirt would likewise be minimal, being accounted for by the thickness changes in the part as made.

In the practice of the present invention, the interference relative to the metal might be increased from a line-to-line dimension or 0.001", as just described, to perhaps 0.004" to 0.007 for an initial 0,032" wall thickness. This would then result in a substantial thickness reduction and a concomitant skirt elongation, of the order of 15% to 25% elongation, for example.

Referring now to an important feature of the invention, this thickness reduction is responsible for creating the forces used to cause the cold flow of metal used to impart the desired pattern on the wear sleeve surface. The surface contour of the wear sleeve is characteristic of, and is imparted to by, the surface finish on the i.d. of the wall section 100 of the forming die 92. Here, as shown in FIGS. 7–11, for example, where there are individual vanes, ribs 103 or other embossed areas on the tool, the reverse "image" of these areas will be faithfully reproduced and appear as grooves or slots on the o.d. or seal-facing surface of the wear sleeve. In other words, as the metal is confined by extreme pressure between the o.d. of the punch surface 104 and the i.d. of the die wall 98, it is in effect able to undergo cold flow into a virtually exact, complementary replication of the surface with which it is in contact.

Referring now to other modifications of the form of wall ironing apparatus and method just described, and to the description of the product, it will be understood that a large variety of wear sleeves may be made in the manner described.

Referring to one aspect of the invention, it is noted that the wear sleeve 24 has been described as including a radial flange 60. In most seal applications, there is a benefit to having such a radial flange. The reasons for such flange include its use as a mating surface for a snubber or an auxiliary excluder lip. Such a flange can be used in assembling seal the two components such that the parts have a desired axial clearance. In addition, such a flange provides a holddown area for the blank when the skirt is being drawn as described herein. However, the presence of such a flange is not absolutely necessary in the finished product, and hence, it might be removed from the final product if this were considered desirable for some reason. Likewise, the flange could effectively be retained but be reformed into another configuration for one or more purposes known to those skilled in the art.

According to the method just described, and one which is by far the most common, the radial flange extends outwardly and the skirt portion has an outwardly facing or o.d. surface which engages the seal band on the elastomer component of the seal assembly. However, so-called radially outwardly acting seals are also known, and were such a seal to be made, the orientation of the parts would be reversed.

In other words, during manufacture, the flange might be directed inwardly and the blank would be initially supported on a mandrel. A mandrel would be thus be the stationery die element and have its outer diameter surface patterned so as to create a counterpart pattern in the finished product. In such an instance, the movable element in the dieset would be a draw ring that would be moved Over the mandrel to form the skirt of the wear sleeve. In this way the radially outwardly facing surface of the skirt would be plain but its inwardly directed surface would be patterned. As long as the stationery element of the die set contains the patterned surface, and the relative movement of the die parts is such as to wipe the skirt-forming metal over and into contact with the patterned surface with sufficient force to cause the requisite cold flow, the objects of the inventive method can be achieved.

In the embodiments described, the finished wear sleeve product has had a debossed, grooved, or slotted surface. This is caused by raised formations such as the ribs 103 on the forming die wall. If the forming die of the type shown in FIGS. 7–9 and 11 were made so as to have reverse image formation such as slots or grooves therein, then the wear sleeve would bear a male or outwardly extending pattern on its surface. It is considered within the ambit of the invention, therefore, to make wear sleeves that are slotted or grooved on the one hand, or, in an alternate embodiment, to have outwardly extending ribs or vanes formed thereon. The intended application and other factors are used to determine which form of invention is preferred for a particular application.

FIG. 16 illustrates an alternative form of wear sleeve generally designated 24a. The sleeve 24a has OD and ID surfaces 64a, 68a defining therebetween a wear sleeve skirt 62a extending axially from the inner margin of the sleeve radial flange 60a.

In FIG. 16, the thickness of the skirt $T_s$ is shown. The skirt thickness is illustrated by the dimension $T_s$, and the height of the ribs or vanes 66a extending upwardly therefrom are shown to be formations having a height $H_f$. As in the other examples, the ribs or vanes 66a protrude only very slightly above the remainder of the OD wear surface 64a, typically in an amount of about 0.0005 inches, although such ribs may be made somewhat higher in an appropriate application. FIG. 16 is accordingly diagrammatic in character and not to scale, it being understood that the skirt thickness $T_s$ might typically be from 0.0020 up to as much as 0.0062 or more, for example. In any case, the height of the formations is just sufficient to obtain the desired pumping action and still low enough to maintain a good static seal.

Referring now to the exact hydrodynamic pattern, a relatively "steep" helix is shown in the embodiment of FIGS. 1–14. This type of formation has been shown for ease of illustration. However, at least in some instances, it is preferred to have the formations comprised of only one or two elements, arranged in a very shallow pitch.

FIG. 17 shows a wear sleeve generally designated 24b that embodies such a pattern. Here, the radial flange 60b is conventional and the outer diameter 64b of the skirt is likewise conventional. However, one or more very shallowly angled grooves or indentations 66b are provided and are shown to be of a very shallow pitch. In the example intended to be illustrated, although the drawing is not to scale, the pitch of the helix is 32 threads or grooves per inch, and each of the grooves has a depth of 0.0005 to 0.001 inches below the remainder of the outer surface 64b. In the instance just illustrated, i.e., one wherein the pitch is about 0.030–0.033 inches per groove, the actual seal band, depending upon its state of wear, may span only one or two grooves.

A very shallow or gradual pitch angle, such as that referred to above and schematically illustrated in FIG. 17 tends to create a more effective static seal and to have a somewhat diminished, although still effective pumping action. Selection of the pitch angle can be made depending upon the width of the seal band, and should account for the possibility that there may be some very slight misalignment or cocking of the seal within the bore. The angle of the helix should be at least somewhat in excess of any angle which might occur from a very slightly misaligned seal.

Referring now to FIG. 15, another version of the novel seal is illustrated. Here, a shaft 32c positions a rubber mounting section 70c for a wear sleeve generally designated 24c. The wear sleeve here is identical to its counterpart 24 in FIGS. 1–3, for example, in that it includes a radial flange 60c, an axial flange or a skirt 62c having the grooves 66c similar or identical to those described in connection with the other embodiments of the invention. Likewise, other portions of the seal, including the seal casing 38c having the axial and radial flanges 40c, 42c are provided.

However, in the example illustrated in FIG. 15, a molded elastomer section 111 is shown to position a seal element 113 made from a contoured sheet of a non-elastomeric material such as a sheet of polymeric tetrafluoroethylene (TFE) filled with glass fibers and graphite. The TFE element 113 includes a contoured margin 115 having a radially inwardly facing surface 117 adapted to make contact with the outer surface 64c of the wear sleeve. A radially outer section of the TFE element 113 includes a contoured, snubber-forming annular rib 119 overlying an enlarged annular elastomeric rib 121. According to this form of the invention, the section 119 of the TFE face engages the axially inwardly directed end face surface 74c of the radial flange 60c.

The embodiment of 15 is intended to illustrate that the seal element used to contact the wear sleeve need not be made from a molded lip or trimmed lip elastomer, but may be made from non-elastomeric materials, or from other materials known to be effective for fluid seals. A TFE seal element 113 has been illustrated in the embodiment of FIG. 15 to show that, providing the pumping elements on the wear sleeve has additional advantages. For example, it has proved difficult to impart hydrodynamic formations, including those of a very gradual pitch, to TFE seal elements. In the past, the sheets of TFE from which a seal element is cut were often required to contain embossed or debossed sections with raised or depressed hydrodynamic formations, imparted by coining, for example. Since seals made from TFE sheets or wafers are relatively incapable of supplying a resilient radial compressive load to the seal area, their ability to seal under a wide range of conditions may be compromised. Using the hydrodynamic wear sleeve of the present invention, advantage can be taken of the good static seal provided by such units and this may be combined with the hydrodynamic capabilities made available by using the extremely shallow, narrowly angled grooves.

Referring now to another matter, while the manner of making blanks from which the novel wear sleeves of the present invention are formed is not in itself considered novel, it is possible to make such wear sleeves in a rapid, effective manner.

FIG. 12 illustrates one manner in which a plurality of blanks "B" can be arranged for machine feeding from a coil. After an initial blanking and piercing operation is performed, a coil of continuous sheet material remains. This comprises a plurality of individual blanks B1, B2, B3, etc., each having a connecting tab 97 attaching it to a continuous strip 99 used in indexing and feeding operations incident to use of the die set 76. The tabs 97 are arranged in pairs, as is known to those skilled in the art. A die set such as that shown in FIGS. 6–9 may be sequentially fed with an array "A" of blanks B1, B2, etc. with each of the tabs 97 being sheared from the remainder of the blank B as a part of the intermittent drawing and forming operation.

The invention is intended to comprehend forming of a wide variety of patterns, including those which have previously been proposed and/or used on the elastomeric part of hydrodynamic oil seals. Specifically, these include variable depth grooves or ribs, vanes arranged in a series of V configurations so as to provide bidirectional pumping, or sinuous patterns for the same purpose. In addition, the formation of triangles, or elliptical, oval, or circular sections, may also prove advantageous, depending on the application, including the sealed mechanism, the lubricant, and the temperatures expected to be encountered.

In addition to the advantages discussed above, the present invention can provide a great deal of adaptability and low cost in use. The wear sleeve, as pointed out, may be made with or without a rubber mounting surface. Auxiliary hydrodynamic formations may also be placed on the elastomeric portion of the seal if desired, although this is usually not necessary or even desirable.

Providing the exceptionally minute dimensional contours can in many cases render the seal assembly very attractive where the elastomer or similar portion of the seal is relatively hard. In this connection, while the seal lip may be made from a conventional elastomeric material, it is becoming increasingly common to either make the primary seal lip from a fluorocarbon material, a fluoroelastomer, or similar material that does not deform readily and rapidly. Thus, the invention is also useful where the primary seal lip is not made from a soft elastomer and hence is not flexible, but is made from a harder elastomer or an altogether non-elastomeric material. Composite lips, i.e., those made from an elastomer having a fluorocarbon layer bonded thereto are also advantageously used with the invention.

As pointed out, the invention can be very useful in reducing the stock of part numbers required to be made or invented for a variety of applications. A primary seal unit can be manufactured and used satisfactorily without a wear sleeve, with an ordinary wear sleeve, or with a wear sleeve made according to the invention. As long as the seal itself is satisfactory, it may be used with wear sleeves of the kind just described, or with those having more or less contouring in the hydrodynamic formations. This effectively enables the existing seals to be "tailored" to difficult applications with only a change in a drawing die being required to achieve a different level of hydrodynamic pumping.

It will thus be seen that the present invention provides a novel apparatus method and product having a number of advantages and characteristics, including those pointed out herein and others which are inherent in the invention. The preferred embodiments of the invention having been described by way of example, it is anticipated that variations and modifications of the described forms of methods and apparatus will occur to those skilled in the art. It is anticipated that such modifications and changes may be made without departing from the spirit of the invention or the scope of the claims appended hereto.

I claim:

1. A seal assembly for use with two relatively movable elements to be sealed, said assembly comprising a primary seal unit and an associated sheet metal wear sleeve, said primary seal unit including a casing for mounting relative to one of said two relatively moveable elements and a seal element including a circumferentially continuous elastomeric body having a portion bonded to said casing and another portion biased by its own innate resiliency toward said wear sleeve whereby snug, fluid-tight sealing contact may be made between a portion of said seal element and a mating surface of an associated wear sleeve, said associated wear sleeve having a radial flange and a generally cylindrical portion adapted to be fixed in fluid-tight relation to the second of said relatively movable elements, said cylindrical portion being of reduced thickness relative to the thickness of said radial flange and having thereon a surface pattern formed by metal cold flow during sleeve thickness reduction, said pattern including at least one hydrodynamic pumping element having a contoured portion radially offset from the remainder of said cylindrical portion.

2. A seal assembly as defined in claim 1 wherein said at least one hydrodynamic element is a continuous helical element said element being offset from the remainder of said cylindrical surface by not more than 0.003".

3. A seal assembly as defined in claim 1 wherein said at least one hydrodynamic element comprises a plurality of individual elements arranged in a helical pattern.

4. A seal assembly as defined in claim 1 wherein said at least one hydrodynamic element comprises a plurality of helically arranged elements, each element being in the form of a groove or slot of a depth not exceeding 0.003", each of said slots being formed in a radially outwardly directed surface of said cylindrical portion.

5. A seal assembly as defined in claim 1 wherein said at least one hydrodynamic element comprises a plurality of helically arranged elements each element being in the form of a groove or slot of a depth of from about 0.0005" to about 0.001" said slot being formed in a radially outwardly directed surface of said cylindrical portion.

6. A seal assembly as defined in claim 1 wherein said at least one hydrodynamic element comprises a plurality of helically arranged elements each element being in the form of a rib or vane of a height not exceeding 0.003" said rib or vane slot being formed on a radially outwardly directed surface of said cylindrical portion.

7. A seal assembly as defined in claim 1 wherein said at least one hydrodynamic element comprises a plurality of helically arranged elements, each element being in the form of a rib or vane of a depth of from about 0.0005" to about 0.001", each of said ribs or vanes extending radially outwardly from said surface of said cylindrical portion.

8. A seal assembly as defined in claim 1 wherein said seal element further includes a surface contact element comprises of a polymeric fluorocarbon material.

9. A seal assembly as defined in claim 1 wherein said seal element is a body made entirely from an elastomeric material.

* * * * *